W. D. YOUNG.
HARROW.
APPLICATION FILED APR. 24, 1907.

903,651.

Patented Nov. 10, 1908.
2 SHEETS—SHEET 2.

Witnesses
F. C. Gibson.
Wm Bagger

Inventor
William D. Young.

By Victor J. Evans
Attorney

UNITED STATES PATENT OFFICE.

WILLIAM D. YOUNG, OF ENNIS, TEXAS.

HARROW.

No. 903,651.  Specification of Letters Patent.  Patented Nov. 10, 1908.

Application filed April 24, 1907. Serial No. 370,110.

*To all whom it may concern:*

Be it known that I, WILLIAM D. YOUNG, a citizen of the United States, residing at Ennis, in the county of Ellis and State of Texas, have invented new and useful Improvements in Harrows, of which the following is a specification.

This invention relates to that class of harrows which are composed of one or more frames or sections, the cross-bars of which are provided with earth engaging teeth depending therefrom; and the object of the invention is to provide a harrow of this kind with means whereby accumulations of stalks and other rubbish may be discharged from the harrow, while the latter is in operation.

Further objects of the invention are to simplify and improve the construction and operation of this class of devices.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention; it being, however, understood that no limitation is necessarily made to the precise structural details therein exhibited, but that changes, alterations and modifications within the scope of the invention may be resorted to when desired.

Figure 1:
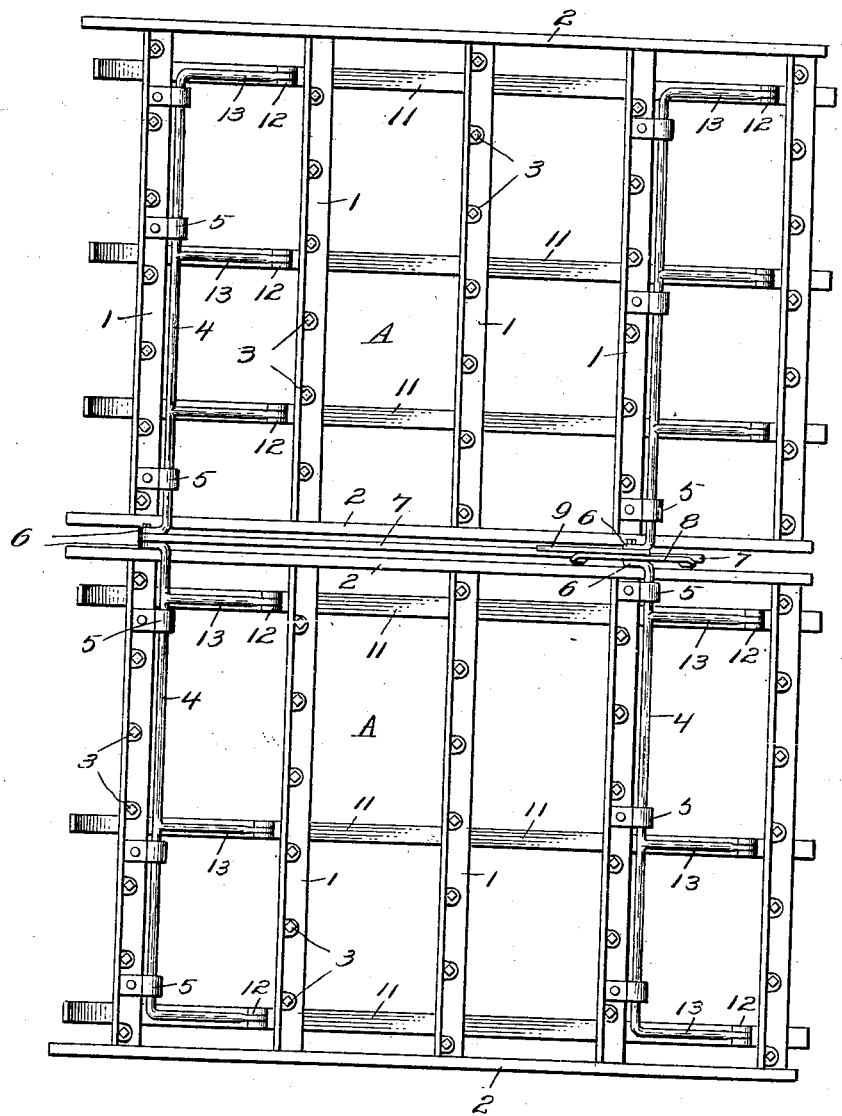
Figure 2:
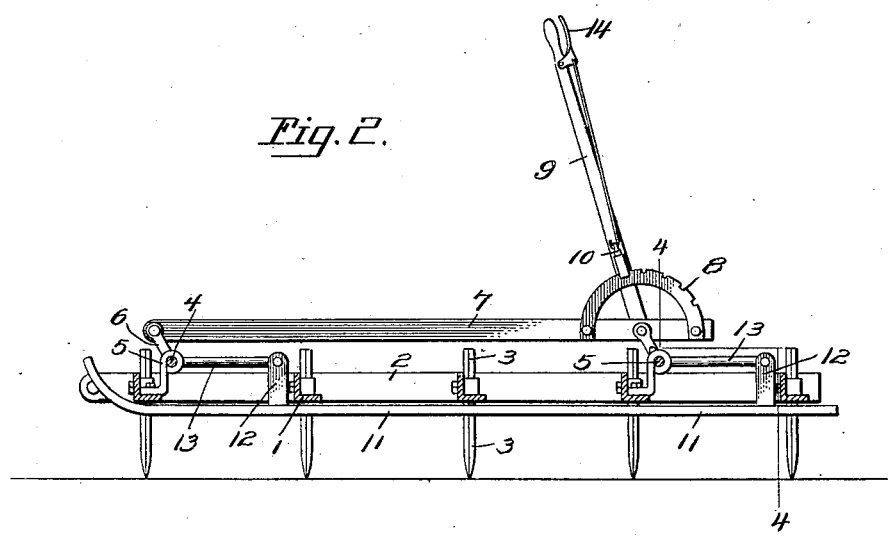
Figure 3:
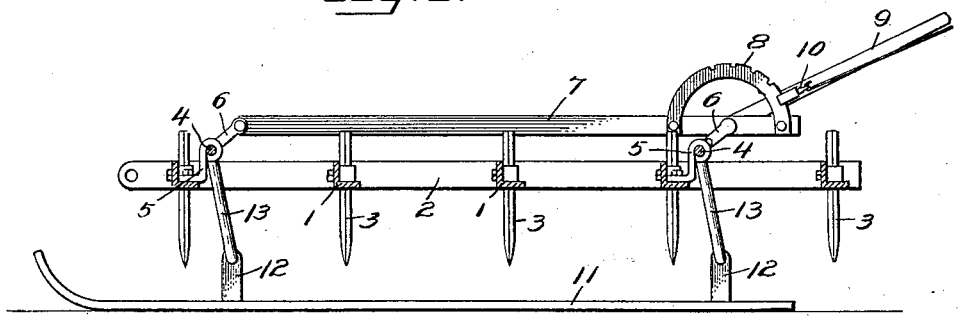
Figure 4:
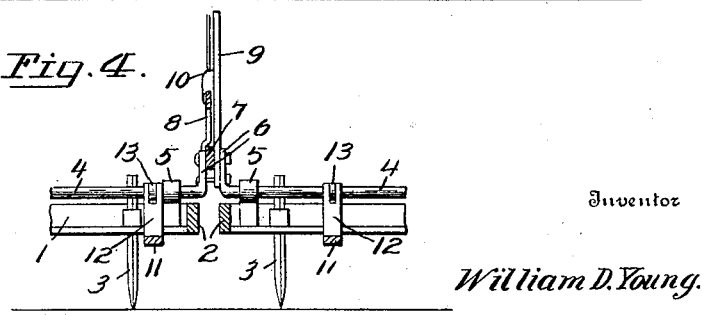

In the drawings, Figure 1 is a top plan view of a harrow constructed in accordance with the invention. Fig. 2 is a longitudinal sectional view showing the harrow in position for operation. Fig. 3 is a longitudinal sectional view showing the harrow in dumping or discharging position. Fig. 4 is a transverse sectional detail view taken on the plane indicated by the line 4—4 in Fig. 2.

Corresponding parts in the several figures are denoted by like characters of reference.

In the drawings has been shown a harrow composed of two frame sections A—A each of which includes a plurality of transverse bars 1—1 suitably spaced and connected by means of longitudinal bars 2—2. The transverse bars 1—1, which are preferably made of angle iron, are provided with teeth 3—3 which have been shown as extending vertically therethrough and which may be clamped upon and secured to the said transverse bars by any suitable means.

Each of the harrow sections A is provided with a pair of rock shafts 4—4 which are supported for oscillation in bearing clips 5 that are bolted in suitable positions upon the horizontal webs or flanges of some of the transverse bars 1. These rock shafts are provided at their inner ends with arms or cranks 6 that are pivotally connected with a longitudinally disposed bar 7 carrying a segment rack 8; one of the cranks being extended to form a lever or handle 9 having a stop member or locking dog 10 adapted to engage the segment rack 8 for the purpose of retaining said lever at various adjustments.

Each of the harrow sections is provided with a plurality of runner shoes 11 having upward extending brackets 12 which are pivotally connected with cranks 13 that extend radially from the rock shafts 4; it will be seen that by oscillating said rock shafts in their bearings, the runners may be carried in an upward direction until they are supported directly below and adjacent to the cross-bars 1 of the harrow frame, as shown in Fig. 2 of the drawings; the said runner shoes may be depressed until they engage or rest upon the ground, after which by continuing the oscillation of the rock shafts, the harrow frames will be elevated above the ground as will be seen in Fig. 3. The parts may be secured in any of the different positions indicated or in various intermediate positions, by engaging the stop member 10 of the lever 9 with the segment rack 8. The lever 9 is provided with a handle 14 whereby the stop member 10 may be conveniently manipulated.

From the foregoing description taken in connection with the drawings hereto annexed, the operation and advantages of this invention will be readily understood, by those skilled in the art to which it appertains. It will be readily seen that the runner shoes may be adjusted in various positions so as to regulate the extent to which the harrow teeth shall be permitted to penetrate into the ground. It will also be seen that stalks and other rubbish accumulated by the harrow may be readily discharged by manipulating the lever so as to throw the harrow frame or frame sections to the elevated position shown in Fig. 3, when the harrow will be supported upon the runners in such a manner that the rubbish will pass from under the teeth. When the harrow is supported in this position it may also be conveniently transported, upon the runners from one place to another.

The improved harrow is simple in construction, durable, easily operated, and thoroughly efficient for the purposes for which it is provided.

Having thus fully described the invention, what I claim as new is:—

A harrow comprising two frame sections each composed of a plurality of spaced and connected cross bars, and teeth secured vertically upon said cross bars, pairs of rock shafts supported upon the frame sections and provided with cranks at their inner ends and with radially extending arms, a longitudinal bar disposed between the two frame sections and having a segment rack, said bar being connected pivotally with the cranks at the inner ends of the rock shafts, and one of said cranks being extended to form a lever, a stop member upon said lever coöperating with the segment rack to retain the parts at various adjustments, and a plurality of longitudinally disposed runner shoes beneath each frame section, said runner shoes being provided with upward-extending, rigid brackets having pivotal connection with the radial arms of the rock shafts, whereby said frame sections may be raised and lowered, and supported, for transportation, with the points of the harrow teeth elevated above the ground.

In testimony whereof, I affix my signature in presence of two witnesses.

WILLIAM D. YOUNG.

Witnesses:
B. L. PARR,
J. F. GARTIN.